Patented Sept. 10, 1935

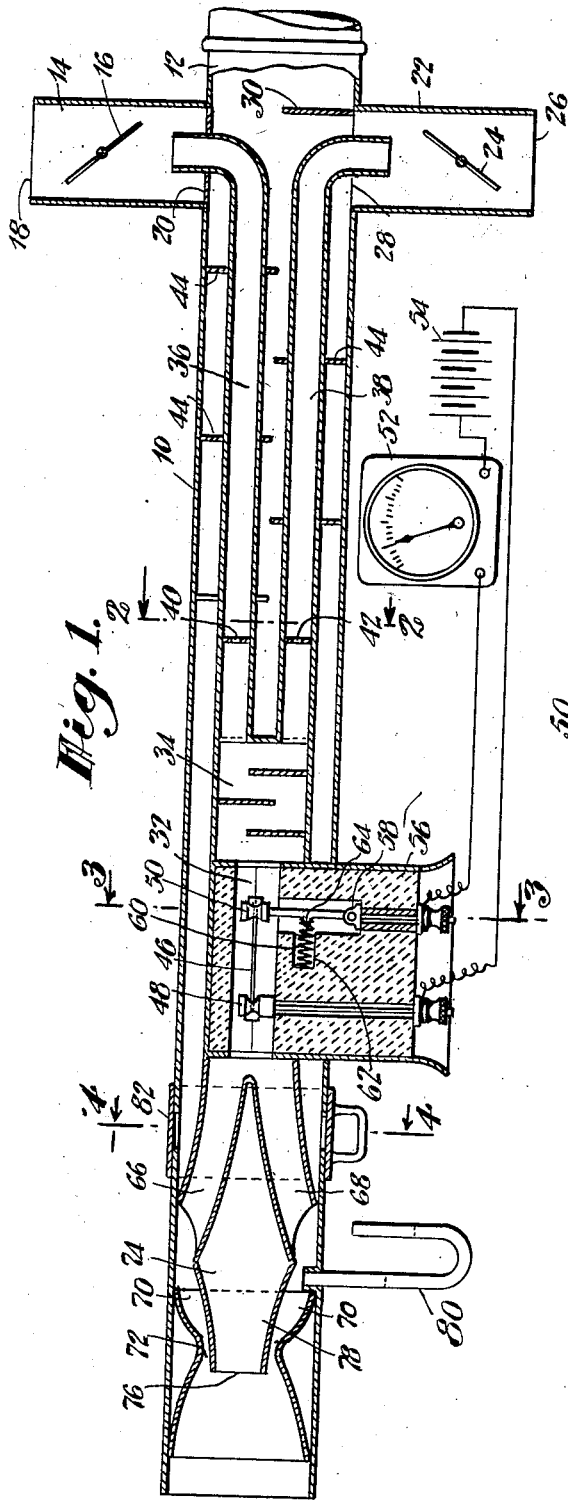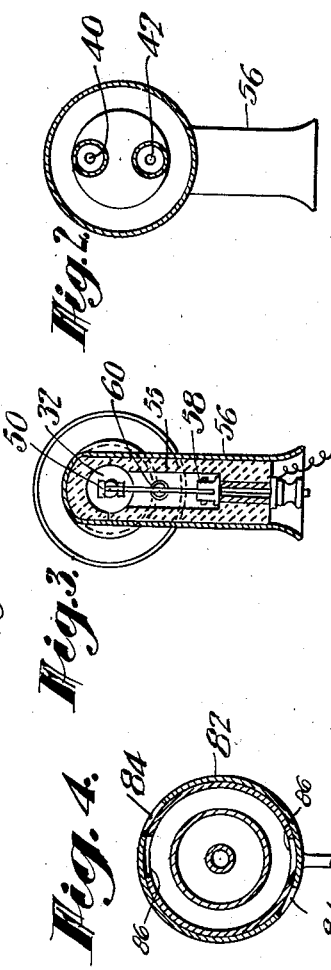

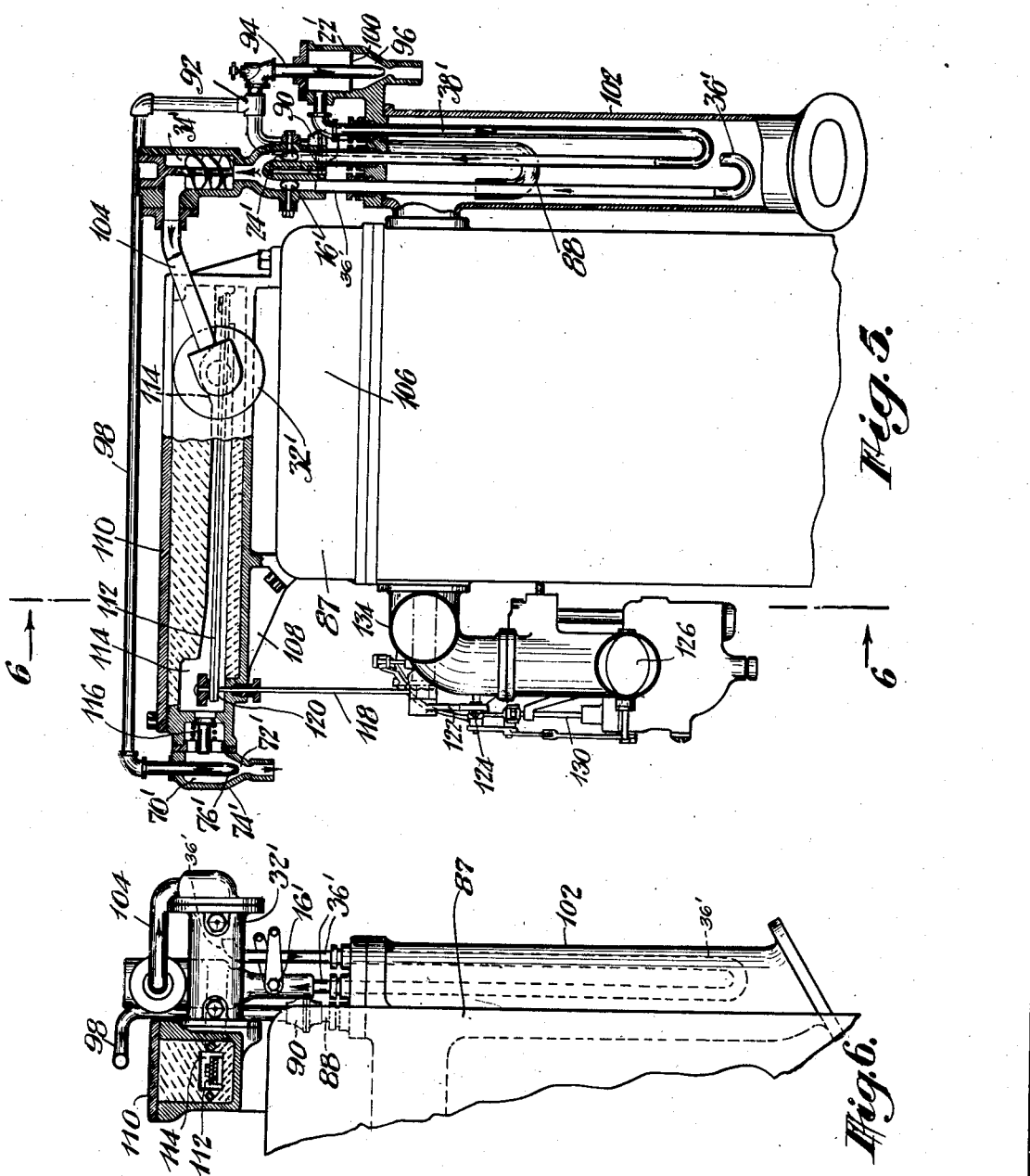

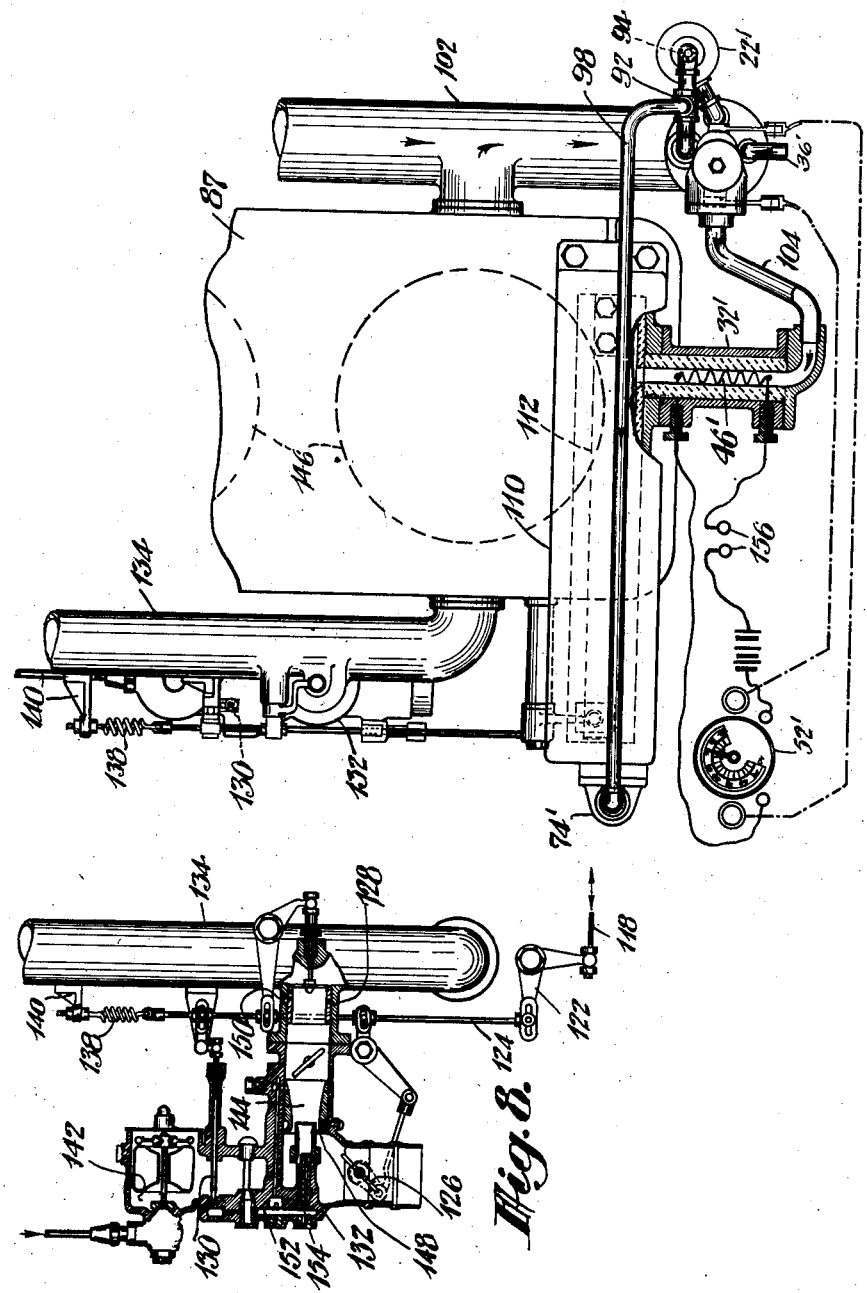

2,013,998

UNITED STATES PATENT OFFICE 2,013,998

COMBUSTIBLE GAS ANALYZER

Winder E. Goldsborough, South Norwalk, Conn., assignor to Doherty Research Company, New York, N. Y., a corporation of Delaware Application April 28, 1931, Serial No. 533,382

12 Claims. (Cl. 23—255)

This invention relates broadly to the control of combustion, and more particularly to an improved method and means for analyzing hot gaseous combustion products for their content of unburned combustible, and for automatically utilizing such analysis in maintaining high combustion efficiency.

Combustion in internal combustion engines, and particularly in automobile engines, is generally inefficient and incomplete because of improper carburetor adjustment and spark timing. The efficiency of combustion in such engines also varies over a wide range with variations in engine speed and with variations in the fuel composition and in barometric pressure. Such inefficient combustion manifests itself in deposition of carbon on the valves and other working parts of the engine, and in the presence of unburned noxious gas and vapor components in the exhaust gases.

One object of the present invention is to provide method and means for indicating the degree of completeness and efficiency of combustion in internal combustion engines, so that the operator can make suitable carburetor and spark adjustments to raise the combustion efficiency.

A more particular object of the invention is to provide a simple, rapid and reliable method for continuously analyzing hot gaseous mixtures to determine the amount of combustible therein.

A further object of the invention is to provide simple, sturdy, and portable apparatus for analyzing hot exhaust gases from combustion engines and furnaces.

Another object of the invention is to provide simple and reliable exhaust gas analyzing and combustion regulating apparatus adapted for permanent attachment to an internal combustion engine and operative to automatically regulate combustion in said engine.

The improved gas analyzing apparatus of the present invention comprises a relatively small portable conduit or muffler adapted for attachment to the exhaust pipe of an internal combustion engine or furnace, such conduit being internally fitted with preheater flues, a secondary combustion chamber, ejector throats, and valved gas and air inlets and discharge ports.

The apparatus further includes a regulating device operative in response to variations from normal temperatures obtaining in said secondary combustion chamber by reason of the burning of combustible components of the engine exhaust gases for automatically actuating the carburetor fuel and air valves so as to maintain a high degree of combustion efficiency in said engine. The flow of a major portion of the hot exhaust gases through the analyzing apparatus induces flow of a measured clean sample of the hot gases and of a measured volume of air through the preheater and secondary combustion chamber, where any combustible content of the sample is burned and the change in temperature resulting therefrom is measured and indicated, such measurement being utilized by the regulating device to automatically proportion the supplies of fuel and air to said engine to maintain substantially complete combustion therein.

With the above and other objects and features in view, the invention consists in the improved method and apparatus for analyzing hot gaseous products of combustion and for automatically regulating combustion, which is hereinafter described and more particularly defined in the claims.

In the accompanying drawings, which illustrate the preferred embodiment of the invention:

Fig. 1 is a view in vertical section, with parts in elevation, showing one form of my improved gas analyzing apparatus and the attendant electrical measuring equipment by means of which I analyze hot gaseous products of combustion and indicate the results of such analysis;

Fig. 2 is a cross sectional view of the apparatus of Fig. 1, taken on the line 2—2 of Fig. 1;

Fig. 3 is a cross sectional view of the apparatus, taken on line 3—3 of Fig. 1;

Fig. 4 is a cross sectional view of the apparatus, taken on line 4—4 of Fig. 1;

Fig. 5 shows in vertical section, with parts in side elevation and parts broken away, a modified arrangement of the apparatus of Fig. 1 superimposed on the cylinder of an automotive engine and equipped with an automatic carburetor adjusting attachment;

Fig. 6 is an end view in vertical section partly broken away, taken along the line 6—6 of Fig. 5;

Fig. 7 is a top plan view, with parts in section and parts broken away, showing the relative disposition of the analyzing and regulating elements of Fig. 5 with respect to the engine intake and exhaust manifold; and Fig. 8 shows in vertical elevation, with parts in section, the intake manifold, carburetor, and valve actuating mechanism shown at the left hand side of Fig. 7.

In the embodiment of the invention particularly illustrated in Figs. 1–4, numeral 10 indicates my unitary portable gas analyzing device which, as shown, consists of a small conduit or muffler adapted for permanent attachment at its inlet end 12 to the exhaust pipe of an internal combustion engine or to the flue gas outlet of a furnace in a manner such that all, or a substantial part of, the hot gaseous products of combustion from the engine or furnace will pass longitudinally through the interior of the conduit 10.

At one side of the conduit 10, adjacent its inlet end, there is fixed a short laterally extending chamber 14 in which there is mounted a calibrated close fitting damper 16. The end 18 of this chamber 14 is open to the atmosphere, and the opposite end is attached to the outer wall of conduit 10, with section 20 of the wall forming a partition between the interior of conduit 10 and chamber 14. A short lateral discharge conduit 22 is attached to the other side of conduit 10 and fitted with a calibrated tight fitting damper 24. The interior of conduit 22 is ported out at its end 26 to atmosphere, and its end 28 is ported out into the interior of conduit 10. A baffle 30 is mounted on the interior of conduit 10 on the upstream side of the inlet to discharge conduit 22. Conduit 22 serves as a valved exhaust conduit through which a small proportion, for example 10% by volume, of the hot gaseous products of combustion admitted to conduit 10, is directly deflected or discharged to atmosphere without passing through the conduit 10.

A short secondary combustion chamber 32 of restricted cross section is axially mounted in conduit 10 at a point intermediate the inlet and discharge ends thereof. Communicating with chamber 32 on the upstream side, and mounted axially of the conduit, there is a baffled mixing chamber 34 into which are ported out the discharge ends of two tubes 36 and 38. The inlet end of tube 36 extends through the wall 20 of conduit 10 into chamber 14 on the downstream side of damper 16, while the corresponding inlet end of tube 38 extends into lateral conduit 22 on the upstream side of valve 24. Conduits 36 and 38 serve respectively as air and gas sample supply conduits through which measured volumes of air and clean exhaust gas are conducted into mixing chamber 34 for purposes of testing the gas sample for its combustible content by secondary combustion in chamber 32. The conduit 22 also functions, with its damper 24, as a dust separator, the velocity of that portion of the gas which is discharged from conduit 10 past damper 24 to atmosphere being high enough to carry with it any entrained solid particles, so that the gas sample which is withdrawn from the conduit 22 through tube 38 is relatively clean.

Air entering mixing chamber 34 through lateral chamber 14 and tube 36 does so at substantially atmospheric pressure, and owing to the fact that gas passing out through lateral conduit 22 discharges directly to atmosphere, the gas sample entering chamber 34 through conduit 38 is also under substantially atmospheric pressure. Calibrated orifices 40 and 42 are mounted respectively in tubes 36 and 38, these orifices serving in conjunction with dampers 16 and 24 to deliver properly proportioned and measured volumes of air and gas to mixing chamber 34 and combustion chamber 32. The flow of air and gas through tubes 36 and 38, into chamber 34 and thence to combustion chamber 32 is induced by a suction set up and maintained by flow of the main body of gaseous products of combustion through conduit 10, in a manner hereinafter explained.

In passing through tubes 36 and 38 and mixing chamber 34 the gas sample to be tested and the air for burning the same are heated to a uniform temperature by circulation of the main body of hot gaseous products of combustion around the outside of tubes 36 and 38 and chamber 34, and the rate of heat transfer between the main body of gases and the air and gas samples is increased by baffles 44 mounted at spaced intervals on the inner walls of conduit 10. These hot products of combustion normally carry sufficient heat so that there is no condensation of liquid, and their velocity is such that there is no substantial precipitation of solid particles.

On entering combustion chamber 32 the sample of gas taken through tube 38, admixed with the preheated air taken through tube 36, is contacted with an electric heating element 46 in the form of a wire stretched between terminal posts 48 and 50. The wire 46 forms part of an electric circuit including the terminal posts 48 and 50, a galvanometer 52, and a source of electric current indicated as a battery 54.

The wire 46 is heated by its resistance to flow of current from battery 54 to a temperature which suffices to ignite any combustible components present in the gas sample-air mixture. Accordingly, if any unburned combustible is present in the exhaust gas sample, secondary combustion takes place during the passage of the gas sample through combustion chamber 32, and the increase in temperature thus developed in the combustion chamber increases the resistance of wire 46 to current flow therethrough. By proper calibration of the scale of the galvanometer 52, the increase in temperature thus developed in combustion chamber 32 is indicated by the galvanometer in terms of percentage of combustible components in the measured volume of gas sample taken for analysis, or in terms of percentage efficiency of combustion in the engine from which the gas is exhausted.

As shown in Figs. 1 and 3, the combustion chamber 32 has walls preferably constructed of temperature-resistant refractory material. That portion 55 of the refractory forming the bottom half of the combustion chamber wall is constructed in the form of a removable cartridge in which the terminal posts 48 and 50 are mounted, such cartridge being inserted in a metal casing 56 and locked in position by any suitable means. As shown in Fig. 1, the upper part of terminal post 50 is hinged to the base portion of the terminal post at 58, and is normally under the action of a force tending to push it to the right by reason of a coil compression spring 60 mounted in a socket 62 with one end engaging a nub 64 on the left hand side of the upper part of post 50. The action of the spring 60 cooperates with the binding clamps at the top of the terminal posts 48 and 50 to maintain wire 46 under tension so that no opportunity is afforded for sagging. The wire 60 is preferably made of a metal or alloy having a high coefficient of resistance to electrical current flow. The preferred material has been found by test to comprise an alloy containing 25 parts chromium to 100 parts of iron. If desired, however, the wire 46 can be a metal or alloy such as nichrome or one having catalytic properties, as for example, platinum or a metal of the platinum group.

After secondary combustion of any combustible components in the exhaust gases has taken place in combustion chamber 32, the completely burned gas sample continues its flow to the left through Y tubes 66 and 68 into an annular chamber 70 and thence through suction orifice 72 of a gas ejector 74, where admixture with the main body of exhaust gases passed through conduit 10 takes place, followed by discharge to atmosphere.

After passing to the left around the tubes 36 and 38 and the mixing chamber 34, the main body of combustion gases continues its flow through the conduit around the outside of combustion chamber casing 56 and then around Y tubes 66 and 68 into chamber 78 behind the pressure orifice 76 of ejector 74. The flow of the gas sample taken through tube 38 and of the air taken through tube 36 is induced by the suction effect created by the velocity jet of the main body of exhaust gases issuing to atmosphere through pressure orifice 76 of ejector 74. A graduated manometer 80 is mounted with one leg communicating with the suction chamber 70 for the purpose of indicating the degree of suction maintained by the ejector. By means of a damper 82 having orifices 84 adapted to match orifices 86 in the wall of conduit 10 (see Fig. 4), the negative pressure developed in suction chamber 70 by the ejector 74 can be adjusted and maintained at a substantially uniform pressure after the calibrated dampers 16 and 24 and orifice plates 40 and 42 have been properly adjusted.

In using the apparatus of Figs. 1–4 the conduit 10 is first attached at 12 to the exhaust pipe of an automobile or other source of gas mixture to be analyzed. With the damper 16 closed and the damper 24 in calibrating position, the damper 82 is turned to a position giving a predetermined degree of negative pressure in chamber 70 resulting from flow of the main body of gases to be tested through pressure orifice 76. The heating element 46 is then placed in closed circuit with the battery 54, and the indicator pen of the galvanometer 52 is set over the calibration zero point on its scale. Damper 16 is then opened to a predetermined calibrated position for supplying the desired volume of air to burn combustible carried by the gas sample flowing through tube 38. On ignition and burning of the combustible content of the gas sample by contact with hot wire 46 in chamber 32, the increase in temperature thus developed results in a decrease in flow of current through the electrical circuit of the galvanometer, and the indicating scale of the galvanometer shows the results of such combustion analysis of the gas sample either in percentages of combustible present in the sample of gas analyzed, or in percentage efficiency of combustion in the engine to which the testing device is attached.

The gas analyzing device 18 which has just been described will normally have an overall length not exceeding two feet in capacities designed for operative attachment to the exhaust pipes of automobiles. The device is of simple and light but sturdy design and lends itself readily to adaptation as a permanent automobile accessory, with the galvanometer 52 mounted on the dashboard where its readings inform the operator how and when adjustments of carburetor and spark timing should be made.

The gas sampling and analyzing elements of the apparatus illustrated in Figs. 5–7 inclusive are substantially the same in design and function as the corresponding units of the gas sampling and analyzing device of Figs. 1–4 just described. Thus in the apparatus shown in Figs. 5–7 part of the exhaust gases from the internal combustion engine 87 is conducted by a pipe 88 (Fig. 5) through a pressure regulating valve 90 and delivered at constant pressure to the Y-connection 92. Here the stream of exhaust gases is divided into two parts, one of which is led through a valved conduit 94 and discharged to atmosphere through ejector throat 96 of a dust separator 22′. Another portion of the exhaust gases is conducted from fitting 92 through a pipe 98 and is discharged to atmosphere through the pressure orifice 76′ of ejector 74′. A measured sample of the exhaust gases for analysis is continuously withdrawn from the dust separator 22′ at the upstream side of a screen 100 and conducted by a tube 38′ back into and through the exhaust manifold 102 wherein its temperature is raised substantially to that of the exhaust gases. Simultaneously air in measured volume for burning the sample of exhaust gases enters the manifold 102 through a pipe 36′ (Figs. 5 and 7), and it is likewise preheated to the temperature of the exhaust gases during its circulation through that portion of pipe 36′ which is mounted in manifold 102. Valves 24′ and 16′, mounted respectively in the discharge ends of tubes 38′ and 36′, function in substantially the same way as the corresponding valves 24 and 16 and orifices 42 and 40 of the apparatus of Fig. 1, to measure and proportion the flue gas sample and air for burning the same for reliable results in the subsequent gas analyzing operation.

It will be appreciated that in the case of the apparatus of Figs. 5–7 the gas sample and the air for burning the same enter mixing chamber 34′ at substantially uniform temperature and under substantially atmospheric pressure; the flow of air and gas through the tubes 36′ and 38′ into the mixing chamber and thence on through the apparatus being induced by the operation of the ejector 74′, and the preheating of the air and gas sample being effected by indirect heat transfer with the hot engine exhaust gases passing through manifold 102.

The mixing chamber 34′ is equipped with baffles to insure thorough mixing of the gas sample and air. After passing chamber 34′ the gas sample-air mixture is conducted through pipe 104 into the inlet end of combustion chamber 32′ (see Figs. 6 and 7). Any combustible components in the sample are ignited and burned in chamber 32′ by contact with an electrical igniting wire 46′ which corresponds in function and composition with the similar wire 46 of Fig. 1. Any change in the normal temperature obtaining in combustion chamber 32′ as a result of secondary combustion is indicated by the needle of the galvanometer 52′ (Fig. 7).

The apparatus of Figs. 5–8 which has thus far been described is manipulated and calibrated, and functions in substantially the same way, as the corresponding apparatus of Figs. 1–4.

Supported on the top of the engine cylinder housing 106 by a bracket 108 is a combustion regulator housing 110 in which is mounted a bi-metallic temperature responsive differential expansion member 112 (Fig. 5). From combustion chamber 32′ the hot gaseous products of any combustion taking place therein are conducted into and through a chamber 114 so as to be in direct contact with the member 112 throughout substantially the full length thereof. After passing through chamber 114 the burned gas sample is exhausted through a valve 116 into the suction chamber 70′ of ejector 74′ and is then discharged to atmosphere through suction orifice 72′.

A rod 118 operatively connects the free end 120 of the expansion member 112, through a rocker arm 122 and connecting rod 124 (Fig. 8), with the actuating links of primary and auxiliary air intake valves 126 and 128 and with fuel supply valve 130 of a carburetor 132 which supplies measured volumes of atomized fuel and air to engine intake manifold 134.

The operation of the combustion regulating apparatus of Figs. 5–8 is substantially as follows:

When the internal combustion engine 87 is cold, the bi-metallic element 112 will lie in its initial or zero position flat against the horizontal floor of chamber 114, in which position it is held by clamp 136 at its fixed end. The rod 124 is kept under tension at all times by the action of a tension spring 138 which connects the lower end of the rod with a bracket 140 on the intake manifold 134. The bi-metallic element 112 has its lower half preferably constructed of a strip of aluminum or some other metal having a high coefficient of expansion, and its upper half constructed of a strip of iron or some other metal having a much lower coefficient of expansion. The two metal strips comprising the element 112 are securely joined together so that variations in expansion of the respective metals which make up the element have a distorting effect on the element causing its free end 120 to move upwardly away from the floor of chamber 114 in response to increases in temperature in chamber 114, and to move downwardly toward its normal position on the floor in response to drops in temperature in chamber 114.

In the starting position of the apparatus, therefore, with the free end 120 of element 112 in a depressed position against the floor of chamber 114, the air intake valve 126 of the engine carburetor 132 will be partially closed, the auxiliary intake valve 128 will be fully closed, and the needle valve 130 controlling the fuel supply from float chamber 142 will be wide open. As the engine begins to turn over a relatively rich mixture of atomized gasoline and air will be carried from mixing throat 144 through the intake manifold 134 into the cylinders 146 of the engine 87. After ignition and combustion in the engine the hot products of combustion will be discharged into the exhaust manifold 102, probably carrying a considerable percentage of unburned combustible, including hydrocarbons and some hydrogen and carbon monoxide. As the exhaust gases pass out through the exhaust manifold in the direction of the arrows the suction initiated from the ejector throat of the dust separator 22' and by the ejector 74' draws a stream of exhaust gases through the pipe 88 into the dust separator 22' and also draws a clean measured gas sample from the dust separator through the preheater tube 38' and mixing chamber 34' into combustion chamber 32' and thence through chamber 114 in contact with the regulator strip 112. Secondary combustion in chamber 32' of any unburned combustible in the sample of exhaust gases taken, raises the temperature of these gases an amount proportional to the combustible content of the gas sample taken, the result being that the expansion element 112 is heated above its normal temperature, and due to its bi-metallic construction its free end 120 raises by distortion an amount which is proportional to the increase in temperature set up in chamber 32.

As the end 120 of element 112 raises, it shifts to the right (see Fig. 8) the rod 124 and the pins carried thereon, actuating the operating crank arms of air valves 126 and 128 and of needle valve 130. Thus the air valves 126 and 128 open to increase the amount of primary and auxiliary air supplied to the mixing chamber 14 of the carburetor, through ports 148 and 150, respectively, at the same time reducing the amount of gasoline entering the mixing chamber of the carburetor through passage 152 and nozzle 154.

By proper adjustment and calibration of the regulating element 112, the carburetor valves 126, 128 and 130 and the actuating mechanism connecting the element 112 and the said valves, a very slight movement of the end 120 of element 112 can be made to effect a very considerable movement of the respective valves 126, 128 and 130. With proper adjustment of the valves and actuating mechanism, the engine can be operated very economically and efficiently, with the element 112 assuming a fixed position with its end 120 elevated only to the point which represents the normal temperature of completely burned exhaust gases passed through the analyzing apparatus without undergoing any increase in temperature in passing through the combustion chamber 32'. With the end 120 of element 112 in its optimum position representing efficient combustion the engine will be much more economical and efficient in its use of fuel than it is when just starting up, at which time a great deal of excess fuel is exhausted from the engine without being burned.

During operation of the engine 87, switch 156 in the circuit of the ignition wire 46' is either kept closed or is closed at frequent intervals for a period sufficient to raise the temperature of the wire 46' to the ignition temperature of any combustible which may be present in the exhaust gases. Any combustion thus set up will of course effect an elevation in the position of the end 120 of element 112, with a consequent automatic reduction in the supply of gasoline and increase in the supply of air to the intake manifold of the engine.

The galvanometer 52' will normally be mounted on the dash board of the automobile or other vehicle of which the engine is a part, and will serve to indicate the degree of efficiency of combustion in the engine. The setting of the valves 24' and 16' and the calibration of the galvanometer 52' will be effected in the manner previously described for calibrating the apparatus of Figs. 1 to 4 inclusive.

If at any time, as during cold weather, it is desired to operate with a continuously rich fuel mixture in the engine, this can be accomplished by partially closing the valve 24'. This will reduce the temperature of the gases entering regulating chamber 114, and consequently result in the lowering of the end 120 of element 112 with resultant partial closing of the air valves and partial opening of the fuel valve of the carburetor 132. In fact any degree of regulation that may be desired in the richness of the air fuel mixture supplied to the engine can be secured by proper adjustment of the instrument board knobs or other control members by means of which valves 24' and 16' are set.

The invention having been thus described, what is claimed as new is:

1. The method of analyzing gaseous mixtures for combustible, comprising dividing a stream of said gases into a major portion and a minor portion, removing suspended particles from said minor portion and taking a clean, measured sample thereof under substantially atmospheric pressure for analysis, passing said major portion of gases in indirect heat transferring relation with said sample and with a measured volume of air, developing a negative pressure for inducing flow of said gas sample and air by discharging said major portion to atmosphere through a flow orifice, admixing the thus preheated air and gas sample and igniting and burning any combustible present in the gas sample, re-admixing the products of said combustion with said major gas portion, and measuring the rise in temperature resulting from such combustion.

2. In controlling combustion, the steps comprising, dividing a stream of gaseous products of combustion into two portions, utilizing suction developed by flow of one of said portions through an ejector to induce flow of a measured volume of the remaining portion through a gas analyzing chamber, and quantitively analyzing the portion of gas flowing through said chamber for its content of an unburned combustion component.

3. The method of analyzing gaseous products of combustion for combustible, comprising deflecting a portion of said gases to atmosphere through a dust separator, utilizing suction developed by flow of another portion of said gases through an ejector to induce flow of a measured sample of clean gas taken from said dust separator and of a measured volume of air in indirect heat transfer relationship with said gases and thence in admixture in direct contact with an electrical resistance heating element maintained at a temperature which suffices to ignite any combustible present in the gas sample, and measuring the combustible content of said gas sample by the change in current flow through said resistance.

4. A unitary gas sampling device comprising a conduit partitioned longitudinally by heat conducting partitions into two main gas passages and having an inlet for gas at one end and an outlet at the other, a dust separator having a calibrated valve controlled discharge passage to atmosphere and an inlet ported out in said conduit at the gas inlet end thereof, an ejector comprising a pressure flow orifice mounted concentrically within a suction orifice at the discharge end of said conduit, said flow orifice communicating with one of the main gas passages of said conduit, the other main passage of said conduit including a gas sampling chamber and communicating at its downstream end with said suction orifice and at its upstream end both with a valved air inlet port and with said dust separator.

5. A unitary gas sampling device comprising a conduit having a gas inlet at one end and a gas discharge outlet at the other, a dust separator ported out in said conduit adjacent the inlet end thereof, heat conducting partitions within said conduit separating the same longitudinally into two main gas passages of which one comprises in connected series individual gas and air preheating tubes, gas and air mixing chamber, a combustion chamber and the suction orifice of a gas ejector, said preheating tubes having their inlet ends ported out respectively into the dust separator and to atmosphere; the other of said passages encircling the preheater tubes and the mixing and combustion chamber sections of the first-named passage and terminating in the pressure orifice of said gas ejector, an adjustable electrical heating and temperature measuring element removably mounted in said combustion chamber and forming part of a circuit including a source of electrical current and means for indicating the combustible content of gas introduced in said combustion chamber from said dust separator, means for proportioning the volume of gas and air introduced into said combustion chamber, means for balancing the pressure of gas and air samples admitted to said preheating tubes, and means for measuring and adjusting the suction effect of said ejector.

6. In analyzing automotive exhaust gases, the steps comprising dividing a flowing stream of the gas to be analyzed into two portions, developing suction by the flow energy of one of said portions, utilizing suction thus developed to induce flow of a measured sample of the remaining portion through a gas analyzer and quantitatively analyzing said sample for its content of a combustion component.

7. In preparing a sample of automotive exhaust gases for analysis, the steps comprising dividing a flowing stream of the gas to be analyzed into two portions, and utilizing suction developed by the flow energy of one of said portions to induce flow of a measured sample stream of the remaining portion through a gas analyzer and to simultaneously induce flow of a measured volume of air from atmosphere into said analyzer.

8. A gas sampling device adapted for analyzing automotive exhaust gases for combustible, comprising a conduit having a gas inlet at one end and a gas discharge outlet at the other end, a refractory cartridge adapted for removable insertion within said conduit and embodying a transverse aperture located to form a refractory lined open-ended combustion chamber extending coaxially of the conduit when the cartridge is in position within the conduit, heat-conducting partitions within said conduit separating the same longitudinally into two main gas passages of which one comprises in connected series a gas sampling tube and the combustion chamber, the other of said passages encircling the sampling tube and the combustion chamber sections of the first named passage. an electrical wire igniting element removably mounted on said cartridge within said combustion chamber aperture, and means connected with said wire for measuring temperature changes occurring in said combustion chamber by reason of combustion of combustible components in exhaust gases passed therethrough.

9. A portable gas analyzing apparatus comprising a tubular member adapted to be connected with the exhaust line from an internal combustion motor and having inlet and outlet ends, a flow-inducing device disposed within the said member near its outlet end, a conduit extending longitudinally within the tubular member with its interior in communication with the latter at a point between the former's inlet end and the said flow-inducing device, the said conduit having two inlets respectively in regulated communication with the atmosphere and with the interior of the tubular member, means for regulating the degree of suction produced in the conduit by the said flow-inducing device, a combustion chamber of refractory material connecting the outlet end of the said conduit with the flow-inducing device, and an electric heating element mounted in the combustion chamber and connected in an electric circuit having therein a galvanometer.

10. A unitary gas sampling device comprising a conduit having a gas inlet at one end and a gas discharge outlet at the other, a gas ejector disposed within said conduit and having a pressure orifice and a suction orifice, a dust separator ported out into said conduit, heat conducting partitions within said conduit separating the same longitudinally into two main gas passages of which one comprises in connected series individual gas and air preheating tubes, a gas and air mixing chamber, a combustion chamber and the suction orifice of the gas ejector, said preheating tubes having their inlet ends ported out respectively into the dust separator and to atmosphere, and the other of said passages encircling the preheating tubes of the first-named passage and terminating in the pressure orifice of said gas ejector.

11. In analyzing exhaust gases from internal combustion engines, the steps comprising dividing a flowing stream of the gas to be analyzed into two portions, discharging one of said portions into a dust separator, exhausting a regulated stream of gas from said separator to atmosphere, utilizing suction developed by the flow energy of the second of said portions to induce flow of a measured sample of the first named portion from said separator for analysis, and analyzing said sample for its content of combustible.

12. A unitary gas sampling device comprising a conduit having a gas inlet at one end and a gas discharge outlet at the other, a gas ejector disposed within said conduit and having a pressure orifice and a suction orifice, a dust separator ported out in said conduit, a valve-controlled discharge passage leading off from said separator to atmosphere, heat-conducting partitions within said conduit separating the same longitudinally into two main gas passages of which one comprises in connected series a preheating tube having its inlet end ported out in the dust separator, a combustion chamber, and the suction orifice of the gas ejector, and the other of said passages encircling the gas preheating tube of the combustion chamber and terminating in the pressure orifice of the gas ejector.

WINDER E. GOLDSBOROUGH.